(12) United States Patent
Gaskins et al.

(10) Patent No.: US 7,411,840 B2
(45) Date of Patent: Aug. 12, 2008

(54) SENSE MECHANISM FOR MICROPROCESSOR BUS INVERSION

(75) Inventors: Darius D. Gaskins, Austin, TX (US); James R. Lundberg, Austin, TX (US)

(73) Assignee: Via Technologies, Inc., Taipei (TW)

( * ) Notice: Subject to any disclaimer, the term of this patent is extended or adjusted under 35 U.S.C. 154(b) by 801 days.

(21) Appl. No.: 10/946,828

(22) Filed: Sep. 22, 2004

(65) Prior Publication Data
US 2005/0216630 A1 Sep. 29, 2005

Related U.S. Application Data

(60) Provisional application No. 60/549,391, filed on Mar. 2, 2004.

(51) Int. Cl.
*G11C 7/06* (2006.01)

(52) U.S. Cl. .............. 365/189.07; 365/189.08; 365/189.09; 365/207; 365/210.1; 365/189.18

(58) Field of Classification Search ............ 365/189.07, 365/189.08, 189.09, 207, 210.1, 189.18, 365/189.19
See application file for complete search history.

(56) References Cited

U.S. PATENT DOCUMENTS

| | | | |
|---|---|---|---|
| 6,243,779 B1 * | 6/2001 | Devanney et al. | 710/305 |
| 6,763,406 B1 * | 7/2004 | Devanney et al. | 710/65 |
| 6,898,648 B2 * | 5/2005 | LaBerge | 710/100 |
| 7,139,852 B2 * | 11/2006 | LaBerge | 710/100 |
| 7,221,292 B2 * | 5/2007 | Hein | 341/55 |
| 7,307,613 B2 * | 12/2007 | Teshirogi et al. | 345/98 |
| 2003/0158981 A1 | 8/2003 | Laberge | |
| 2004/0068594 A1 | 4/2004 | Asaro et al. | |
| 2004/0202244 A1 * | 10/2004 | Pappalardo et al. | 375/240 |

* cited by examiner

*Primary Examiner*—Viet Q Nguyen
(74) *Attorney, Agent, or Firm*—Gary R. Stanford; Richard K. Huffman; James W. Huffman

(57) ABSTRACT

A sense mechanism for data bus inversion including a first memory device and an analog adder. The first memory device stores bits of the bus in a previous bus cycle. The analog adder compares the bits of the bus in the previous bus cycle with bits of the bus in a current bus cycle and provides a data inversion signal indicative of whether more than half of the bits of the bus have changed state. The analog adder operates as a bus state change sense device which rapidly evaluates bus state changes from one bus cycle to the next. The data inversion signal is used for selectively inverting the data bits of the bus and indicating bus inversion according to data bus inversion operation, such as according to X86 microprocessor protocol.

15 Claims, 3 Drawing Sheets

SENSE MECHANISM FOR MICROPROCESSOR BUS INVERSION

CROSS-REFERENCE TO RELATED APPLICATIONS

This application claims the benefit of U.S. Provisional Application Ser. No. 60/549,391, filed on Mar. 2, 2004, which is herein incorporated by reference for all intents and purposes.

BACKGROUND OF THE INVENTION

1. Field of the Invention

The present invention relates to data bus inversion for logic circuits, and more particularly to a method and apparatus for rapidly evaluating state changes for a group of data output bits for the purpose of inverting their state and indicating data bus inversion, such as according to x86 microprocessor protocol.

2. Description of the Related Art

The architecture of the X86 type microprocessors, such as those manufactured by the Intel Corporation, provides a technique for limiting the noise on the data bus. This technique, called data bus inversion, operates to invert the bus signals if a majority (i.e., more than half) of the bus signals would otherwise change state from one bus cycle to the next. Data bus inversion ensures that half or less of the output bus data signals change state during each cycle. The current x86 protocol features a 64-bit data bus D[63:0]# consisting of four 16-bit groups D[63:48]#, D[47:32]#, D[31:16]# and D[15:0]#. A group of data bus inversion (DBI) bits DBI[3:0]# indicates the polarity of each data group of the data bus. In particular, during every bus cycle, each DBI bit in the DBI[3:0]# signal group indicates the polarity of a corresponding 16-bit group of data bus signals. According to standard terminology, the '#' symbol following a signal name implies that the signal is active low. Thus, if DBI[3:0]='HLHL', then DBI[3:0]#='LHLH' where 'H' denotes a High logic level and 'L' denotes a Low logic level. For the data signals D[63:0]#, however, the DBI[3:0]# signals are used to determine data bit polarity.

Logic within an x86 microprocessor is required to evaluate each of the 16-bit groups of data before the data is driven out to the external input/output (I/O) bus. To limit noise on the bus, if more than half of the signals within a signal group change state, then the signal group is driven out to the external bus in opposite polarity, and the state of the data bus signal group's corresponding DBI signal is set to indicate the selected polarity. Hence, a maximum of up to half of the data bits change state from one bus cycle to the next, thereby reducing noise caused by logic level switching. If all 16 bits in the data bus signal group change state on the next bus cycle, rather than toggling all 16 signals within the group, the signals are driven out in their previous logic state, and their corresponding DBI signal is toggled.

The prevailing technique for evaluating the changed state of groups of bits is a combinatorial digital adder. Each of the 16 bits in a group are provided to the adder and a cumulative sum is generated. This technique consumes valuable time potentially resulting in an additional clock delay to complete. It is desired to achieve the noise-reducing benefits of data bus inversion without adding clock delays on the external data bus.

SUMMARY OF THE INVENTION

A sense mechanism for data bus inversion according to an embodiment of the present invention includes a first memory device and an analog adder. The first memory device stores bits of N-bit bus in a previous bus cycle. The analog adder compares the bits of the bus N-bit bus in the previous bus cycle with bits of the bus the N-bit bus in a current bus cycle and provides a data inversion signal indicative of whether more than half of the bits of the bus the N-bit bus have changed state. The analog adder operates as a bus state change sense device which rapidly evaluates bus state changes from one bus cycle to the next. The data inversion signal is used for selectively inverting the bits of the N-bit bus and indicating bus inversion according to data bus inversion operation, such as according to X86 microprocessor protocol. The analog adder includes a logic comparison circuit and an analog sense amplifier. The logic comparison circuit compares the bits of the N-bit bus in the previous bus cycle with the bits of the N-bit bus in the current bus cycle and provides multiple changed state bits. The analog sense amplifier provides the data inversion signal based on the changed state bits. The analog sense amplifier may further include a first voltage divider network, a reference circuit and comparator. The first voltage divider network divides a first voltage referenced to a common voltage (e.g. ground) into a weight voltage at a weight node. In this embodiment, the weight voltage is one of multiple discrete voltage levels indicative of the number of changed state bits being asserted. The reference circuit provides a reference voltage relative to the first voltage and indicative of more than half of the changed state bits being asserted. The comparator compares the reference voltage with the weight voltage and provides the data inversion signal. The first voltage divider network includes at least one activated first P-channel device coupled between the weight node and the first voltage, and N equivalent-sized first N-channel devices coupled between the weight node and the common voltage. Each of the N-channel devices has a gate receiving a corresponding changed state bit. The reference circuit is configured as a voltage divider network. The reference circuit includes a number of activated second P-channel devices coupled between the reference node and the first voltage equal to the number of first P-channel devices, and N equivalent-sized second N-channel devices coupled between the reference node and the common voltage level. In this case, half of the second N-channel devices are turned on and the other half are turned off, which would otherwise set the reference voltage at a midpoint voltage level. The reference circuit further includes a half-sized activated N-channel device coupled between the reference node and the common voltage, which further reduces the reference voltage by an amount representing one-half data bit. The reference circuit provides the reference voltage at a voltage level in between a first discrete voltage level representing N2 changed state bits and a second discrete voltage level representing N2+1 changed state bits.

Registers may be used for storing bus data bits and conveying the bits on successive cycles of a clock, such as is common for pipelined operation. Exclusive-OR logic may be used for comparing data bits between bus cycles for determining the number of data bits that change state. Exclusive-OR logic may also be used to perform data bus inversion.

analog sense amplifier. The logic comparison circuit compares the bits of the bus in the previous bus cycle with the bits of the bus in the current bus cycle and provides multiple changed state bits. The analog sense amplifier provides the data inversion signal based divides a first voltage referenced to a common voltage (e.g. ground) into a weight voltage voltage levels indicative of the number of changed state bits being asserted. The reference circuit provides a reference voltage relative to the first voltage and indicative of more than half of the changed state bits being asserted. The comparator compares the reference voltage with the weight voltage and provides the data inversion signal. may include at least one activated P-channel device coupled between the weight gate receiving a corresponding changed state bit. The reference circuit may also be the reference circuit includes a number of activated second P-channel devices coupled devices and N equivalent-sized second N-channel devices coupled between the reference are turned on and the other half are turned off, which would otherwise set the reference voltage at a midpoint voltage level. The exemplary reference circuit further includes a common voltage, which further reduces the reference voltage by an amount representing voltage at a voltage level in between a first discrete voltage level representing N2 bits.

A microprocessor according to an embodiment of the present invention includes a chip with at least one bus state sense mechanism and inverter provided on the chip. The chip further includes an external data bus and data logic providing a multiple internal data bits for each bus cycle. Each bus state sense mechanism and inverter has an input coupled to the data logic and an output coupled to the external data bus, and each includes a first memory device, an analog adder, and a bus inverter. The first memory device stores the internal data bits from a prior bus cycle. The analog adder compares the stored internal data bits with the internal data bits in a current bus cycle and provides a data inversion signal to the external data bus indicative of whether more than half of the internal data bits have changed state. The bus inverter has an input receiving the internal data bits in the current bus cycle and an output coupled to the external data bus, and selectively inverts the data bits in the current bus cycle based on the data inversion signal.

The analog adder may include a data change sensor, a reference circuit, a voltage divider network and a comparator. The data change sensor has a first input coupled to the data logic for receiving internal data bits in the current bus cycle, a second input coupled to the first memory device for receiving the stored internal data bits from the prior bus cycle, and an output providing multiple data change bits. The reference circuit has a reference node that develops a reference voltage relative to a source voltage, where the reference voltage indicates whether more than half of the internal data bits change state from the prior bus cycle to the current bus cycle. The voltage divider network has an input receiving the data change bits and an intermediate weight node that develops a weight voltage relative to the source voltage. The weight voltage indicates the number of data change bits that are asserted. The comparator compares the reference voltage with the weight voltage and provides the data inversion signal.

A method of data bus inversion according to an embodiment of the present invention includes determining a number of bits of a data bus that change state between bus cycles, converting the number of bits that change state to a corresponding weight voltage, providing a reference voltage indicative of more than half of the bits of the data bus changing state, comparing the weight voltage with the reference voltage, and inverting the data bus if more than half of the bits of the data bus change state.

The method may include storing the bits of the data bus for each bus cycle and comparing the stored bits of the data bus from a prior cycle with corresponding bits of the data bus from a subsequent bus cycle. The method may include exclusive-ORing each bit from the prior bus cycle with a corresponding bit from the subsequent bus cycle. The method may include activating a voltage divider device of a first voltage divider network for each of the number of bits that change state to select a corresponding one of multiple discrete voltage levels as the weight voltage. The method may include pre-programming voltage divider devices of a second voltage divider network with substantially similar voltage divider devices as the first voltage divider network to generate the reference voltage at a voltage level between a first of the plurality of discrete voltage levels corresponding to one-half of the data bits changing state and a second of the plurality of discrete voltage levels corresponding to one-half of the data bits changing state plus one.

BRIEF DESCRIPTION OF THE DRAWINGS

The benefits, features, and advantages of the present invention will become better understood with regard to the following description, and accompanying drawings where.

DETAILED DESCRIPTION

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

The inventors of the present application have recognized the need for the timely evaluation of the changed state of a group of bits of a data bus for determination of data bus inversion, which is useful for limiting noise on the data bus of logic circuitry or processors, such as including microprocessors using the X86 protocol. They have therefore developed a sense mechanism for microprocessor bus inversion that reduces the amount of time required to determine a sum of bit state changes using an analog adder, as will be further described below with respect to FIGS. 1-3.

Figure 1:
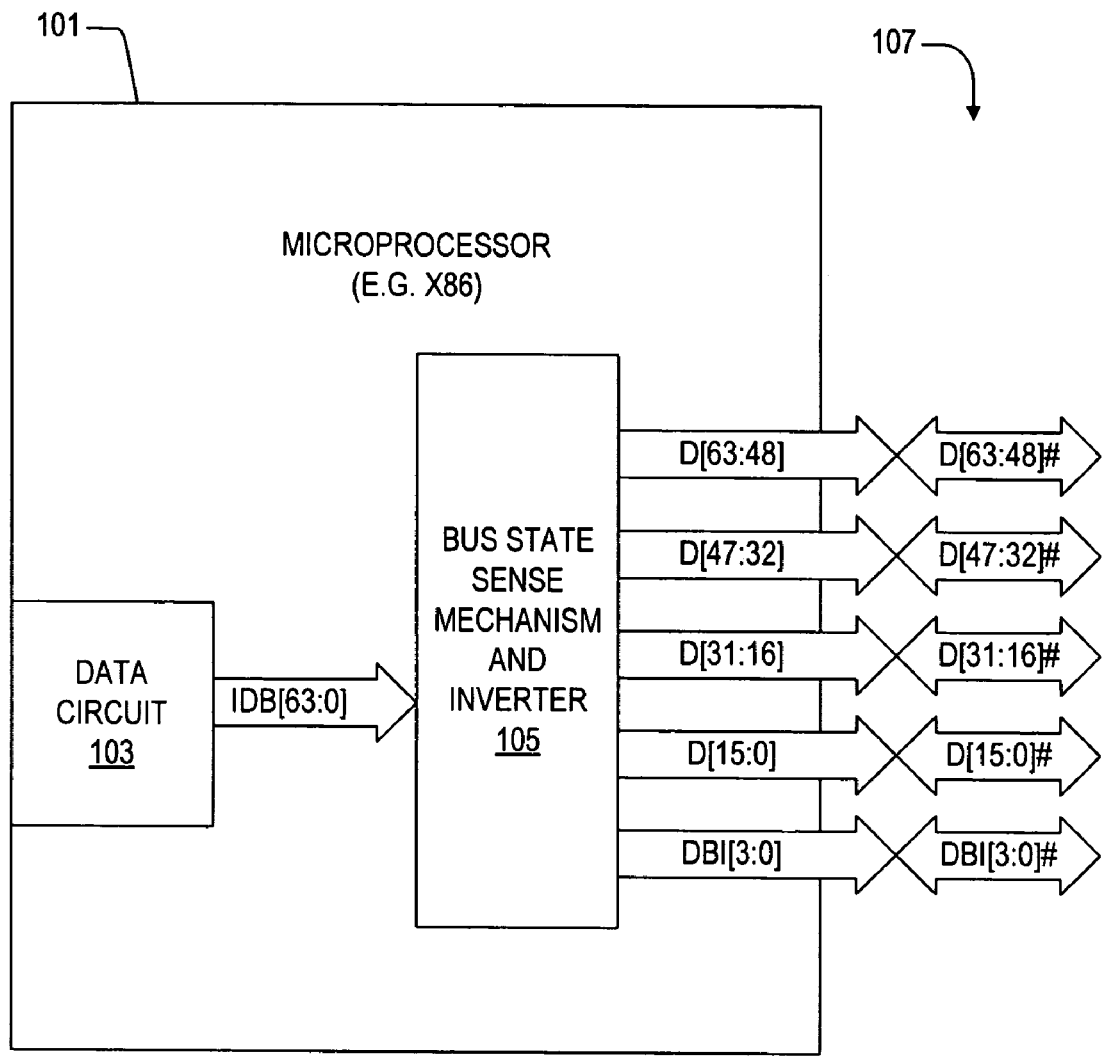
FIG. 1 is a simplified block diagram of a microprocessor incorporating an exemplary sense mechanism for bus inversion according to an embodiment of the present invention.

FIG. 1 is a simplified block diagram of a microprocessor 101 incorporating an exemplary sense mechanism for bus inversion according to an embodiment of the present invention. The microprocessor 101 may be an X86 type microprocessor, although the present invention contemplates any logic circuit employing data bus inversion. The microprocessor 101 is a chip or integrated circuit (IC) which includes a data circuit 103 providing 64 data signals on an internal data bus (IDB), shown as IDB[63:0], to a bus state sense mechanism and inverter 105. The data circuit 103 contemplates any level of complexity for providing data signals on successive bus cycles, and may include complex data logic devices and bus drivers or buffers, or may simply comprise the conductive traces forming the internal data bus conveying the internal IDB[63:0] bus signals. The bus state sense mechanism and inverter 105 receives the IDB[63:0] signals and outputs corresponding data signals D[63:0], which are divided into four groups of 16 signals each, or D[63:48], D[47:32], D[31:16], and D[15:0]. The data signals D[63:0] are asserted onto an external data bus 107, which is also divided into four groups of 16 signals each, or D[63:48]#, D[47:32]#, D[31:16]#, and D[15:0]#.

The bus state sense mechanism and inverter 105 selectively inverts any one or more of the four groups of data signals based on data bus inversion operation. The bus state sense mechanism and inverter 105 also generates four data bus inversion bits DBI[3:0] indicating the state of inversion of each data group of the D[63:0] data signals, where the internal DBI[3:0] signals are externally asserted as the DBI[3:0]# signals. The DBI[3] signal indicates polarity of the D[63:48] signal group, the DBI[2] signal indicates polarity of the D[47:32] signal group, the DBI[1] signal indicates polarity of the D[31:16] signal group, and the DBI[0] signal indicates polarity of the D[15:0] signal group. As further described below, the bus state sense mechanism and inverter 105 employs an analog adder to reduce the amount of time to determine the changed state of each group of data bits to enable timely evaluation and selective inversion.

Figure 2:
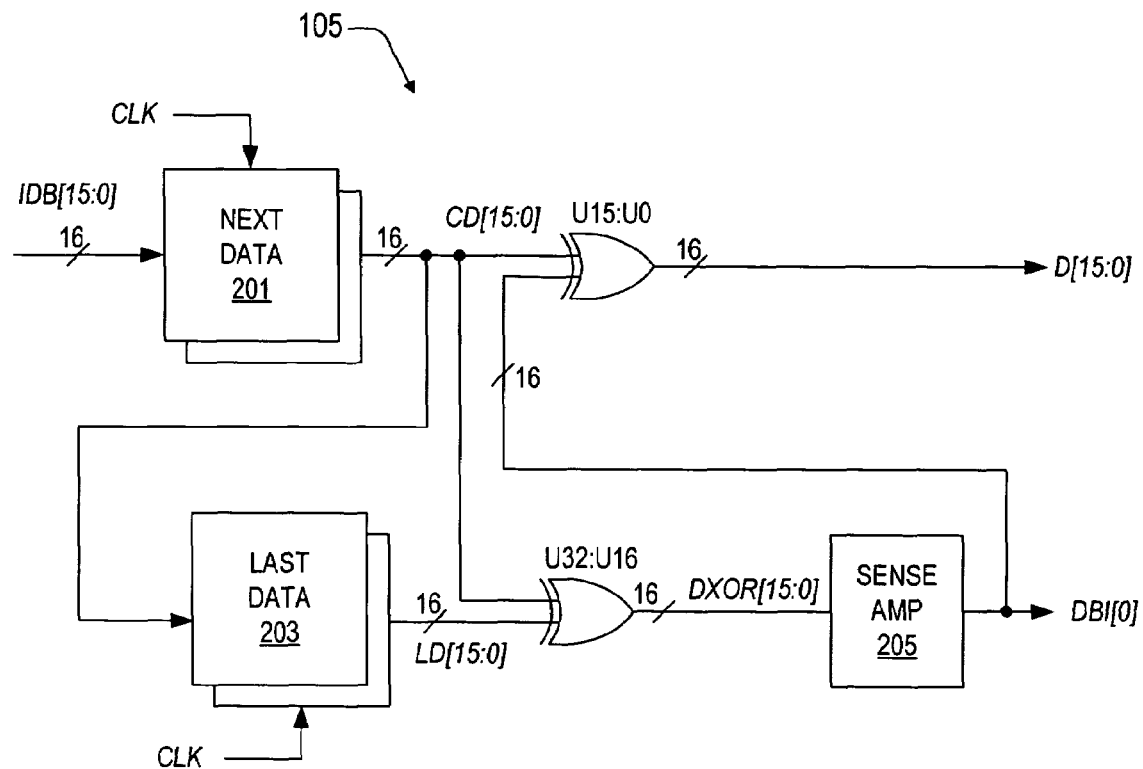
FIG. 2 is a more detailed schematic and block diagram of an exemplary embodiment of a portion of the bus state sense mechanism and inverter of FIG. 1.

FIG. 2 is a more detailed schematic and block diagram of an exemplary embodiment of a portion of the bus state sense mechanism and inverter 105. The illustrated portion applies to the D[15:0] group of data bits and the corresponding DBI[0] signal, where it is understood that substantially the same circuit or logic is duplicated for each of the other 16-bit data groups and DBI signals of the 64-bit data bus. The IDB[15:0] signals are provided to inputs of a next data register 201, which outputs corresponding current data signals CD[15:0]. The CD[15:0] current data signals are provided to respective inputs of a last data register 203, which outputs corresponding last data signals LD[15:0]. Each of the registers 201 and 203 operate to transfer data signals applied to its inputs to its outputs in response to toggling of a bus clock signal CLK, which generally defines successive data clock cycles. Although registers are illustrated, other types of memory devices are contemplated for storing data bus bits for each bus cycle. Clock toggling may be edge sensitive (e.g., rising edge or falling edge or combination of both) or level sensitive (e.g. high logic level or low logic level or combination of both) depending upon the particular configuration. During each bus cycle, the CD[15:0] current data signals are transferred to the LD[15:0] last data signals and the IDB[15:0] signals are transferred to the CD[15:0] current data signals, such as according to pipelined operation as known to those skilled in the art.

Each of the CD[15:0] current data signals is provided to one input of a corresponding one of a first group of 16 exclusive-OR (XOR) gates U15:U0, and to one input of a corresponding one of a second group of 16 XOR gates U32:U16. Each of the LD[15:0] last data signals is provided to the other input of a corresponding one of the second group of 16 XOR gates U32:U16, which collectively output 16 corresponding changed state signals DXOR[15:0]. In particular, the CD[0] and LD[0] signals are provided to a XOR gate U16, which outputs the DXOR[0] signal, the CD[1] and LD[1] signals are provided to a XOR gate U17, which outputs the DXOR[1] signal, and so on. In this manner, the XOR gates U32:U16 collectively form a logic comparison circuit or data change sensor that compares corresponding bits of the data bus from one bus cycle to the next, and each of the DXOR signals is a data change bit that indicates whether the corresponding data bus signals have changed state from one bus cycle to the next.

In accordance with XOR logic, if the CD[1] and LD[1] signals are the same state, then the DXOR[1] signal is asserted to a Low logic level or 'L', and if the CD[1] and LD[1] signals are at different states, then the DXOR[1] signal is asserted to a High logic level or 'H'.

The DXOR[15:0] changed state signals are provided to respective inputs of a sense amplifier 205, which asserts the DBI[0] signal. The DBI[0] signal is provided to the second input of each of the first group of 16 XOR gates U15:U0, which collectively output the D[15:0] data signals. The sense amplifier 205 asserts the DBI[0] signal high if more than half, or at least 9, of the 16 DXOR[15:0] changed state signals are asserted high, but otherwise asserts the DBI[0] signal low. When the DBI[0] signal is asserted high, the D[15:0] data signals are inverted relative to the CD[15:0] signals according to XOR logic operation. Thus, for example, if CD[1] is low or logic zero and DBI[1] is high or logic one, then the D[1] signal is inverted to a logic one. Otherwise, when only half, or 8 or less, of the 16 DXOR[15:0] changed state signals are asserted high, the sense amplifier 205 asserts the DBI[0] signal low. When the DBI[0] signal is asserted low, then the D[15:0] data signals are the same logic state as the CD[15:0] signals according to XOR logic operation and thus are not inverted. Thus, the XOR gates U15:U0 forms bus inversion logic or a bus inverter that selectively inverts the D[15:0] signals based on the DBI[0] signal.

Figure 3:
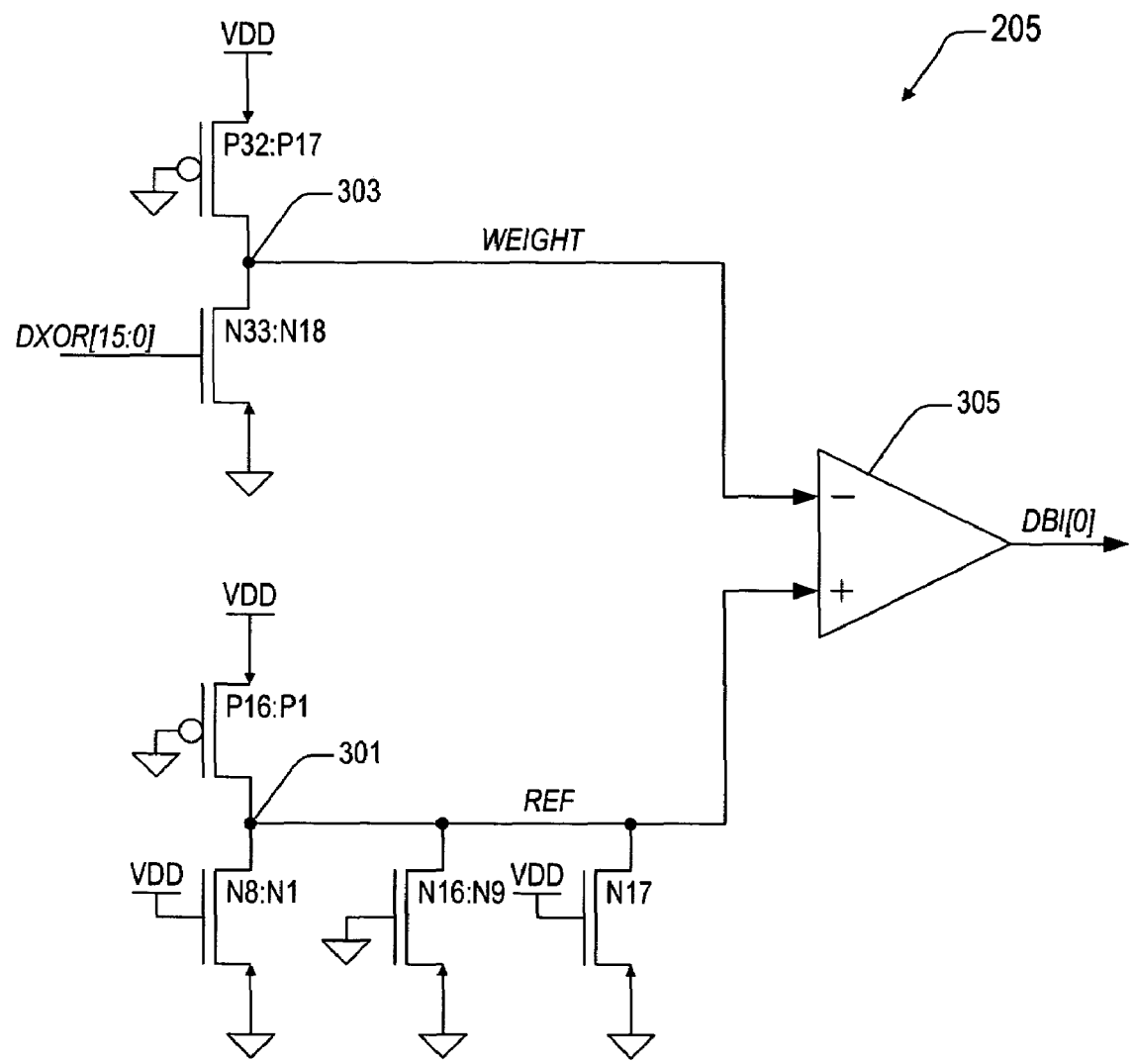
FIG. 3 is a more detailed schematic diagram of an exemplary embodiment of the sense amplifier of FIG. 2.

FIG. 3 is a more detailed schematic diagram of an exemplary embodiment of the sense amplifier 205. A set of 16 P-channel devices P16:P1 have their sources coupled to a source voltage VDD and their drains coupled to a reference node 301 that develops a reference voltage REF. The gates of the P-channel devices P16:P1 are coupled to a common node, which is ground (GND) in the embodiment illustrated, so that they are turned on. VDD is a source voltage relative to the common node having a voltage level indicative of a High logic state within the microprocessor 101, where the common node is at a voltage level indicative of a Low logic state. A set of 17 N-channel devices N17:N1 have their drains coupled to the reference node 301 and their sources coupled to GND. The N-channel devices N17 and N8:N1 have their gates coupled to VDD and the remaining N-channel devices N16:N9 have their gates coupled to GND. In this manner, the P-channel devices P16:P1 and the N-channel devices N17 and N8:N1 are turned on (or activated) and the remaining N-channel devices N16:N9 are turned off (or de-activated). The P-channel devices P16:PI are substantially identical to each other (e.g., having substantially equal sizes) and the N-channel devices N16:N1 are substantially identical to each other (e.g., having substantially equal sizes). The N-channel device N17 is half the width of the N-channel devices N16:N1, such that the on-resistance of the N-channel device N17 is greater than (e.g., twice) that of each of the N-channel devices N16:N1.

A set of 16 P-channel devices P32:P17 have their sources coupled to VDD and their drains coupled to a weight node 303 that develops a data weight voltage referred to as WEIGHT. The gates of the P-channel devices P32:P17 are coupled to GND. A set of 16 N-channel devices N33:N18 have their drains coupled to the weight node 303 and their sources coupled to GND. Each of the DXOR[15:0] signals is provided to the gate of a respective one of the N-channel devices N33:N18. In this manner, the P-channel devices P32:P17 are turned on and the states of the N-channel devices N33:N18 are determined by the DXOR[15:0] signals. The P-channel devices P32:P17 are substantially identical to each other and the P-channel devices P16:P1, all having substantially equal sizes. The N-channel devices N33:18 are substantially identical to each other and the N-channel devices N16:N1, all having substantially equal sizes. The REF voltage is provided to the non-inverting (+) input and the WEIGHT voltage is provided to the inverting (−) input of a comparator 305, which asserts the DBI[0] signal at its output.

The P-channel devices P32:P17 and the N-channel devices N33:N18 form a first voltage divider network that divides the source voltage VDD to establish the WEIGHT voltage at a level indicative of the number of data signals that have changed between data bus cycles. In other words, the voltage divider network converts the DXOR data change bits to a corresponding voltage level of WEIGHT. If none of the data bus signals have changed, then all of the N-channel devices N33:N18 are turned off and the WEIGHT voltage is pulled to VDD. If all of the data bus signals have changed, then all of the N-channel devices N33:N18 are turned on and the WEIGHT voltage is pulled down to a MINIMUM voltage level somewhere between GND and VDD. If the on resistance of each of the N-channel and P-channel devices are approximately equal, for example, (which is not necessarily the case) then the WEIGHT voltage would be approximately one-half of VDD if all of the N-channel devices N33:N18 are turned on. Regardless of the relative on-resistances between the P-channel and N-channel devices, 16 discrete voltage levels are defined between VDD and the MINIMUM voltage level and VDD (not counting VDD when all of the N-channel devices N33:N18 are turned off), where each discrete voltage level indicates the number of the DXOR[15:0] signals that are asserted high. Note that the greater number of the DXOR signals that are asserted, the lower the WEIGHT voltage. The discrete voltage levels include a MIDPOINT voltage level for WEIGHT when exactly half of the DXOR[15:0] signals (or 8 of the 16) are asserted high, and a MAJORITY voltage level when any nine of the DXOR[15:0] signals are asserted high, where the MAJORITY voltage level is one discrete voltage step below the MIDPOINT voltage level. When the WEIGHT voltage is at or below the MAJORITY voltage level, then more than half of the DXOR[15:0] signals are asserted high.

The P-channel devices P16:P1 and the N-channel devices N17:N1 form a reference circuit, which is implemented as a second voltage divider network with voltage divider devices that are "pre-programmed" to divide the source voltage VDD to the REF voltage level. Ignoring the N-channel device N17, since the P-channel devices P16:P1 are equivalent in size to the P-channel devices P32:P17, and since the N-channel devices N16:N1 are equivalent in size to the N-channel devices N33:N18, and since half of the N-channel devices N16:N1 are turned on, then the REF voltage would otherwise be approximately equal to the MIDPOINT voltage level. Since the N-channel device N17 is turned on and has a width that is half the width of the N-channel devices N16:N1 (so that its on-resistance is greater than that of the N-channel devices N16:N1), the REF voltage is pulled to a voltage level that is between the MIDPOINT and MAJORITY voltage levels. In this manner, the REF voltage represents more than 8 (MIDPOINT) but less than 9 (MAJORITY) of the total number of 16 of the DXOR[15:0] signals being asserted high, or a reference voltage level that is equivalent to 8½ data bits changing from one bus cycle to the next.

In operation, when 8 or less of the DXOR[15:0] signals are asserted high representing half or less of the data bus signals changing state, then the WEIGHT voltage is equal to or greater than the MIDPOINT voltage level and thus greater than the REF voltage level. Thus, the comparator 305 asserts the DBI[0] signal low, so that the D[15:0] signals are not inverted and are equal to the logic levels of the CD[15:0] signals. On the other hand, when at least nine or more of the DXOR[15:0] signals are asserted high representing a majority of the data bus signals changing state, then the WEIGHT voltage is equal to or less than the MAJORITY voltage level and thus less than the REF voltage. Thus, the comparator 305 asserts the DBI[0] signal high, so that the D[15:0] signals are inverted relative to the CD[15:0] signals. Since the DBI[0]# signal reflects the logic level of the DBI[0] signal and each of the D[15:0]# signals reflect the respective logic level of each of the D[15:0] signals, logic external to the microprocessor 101 detects the DBI[0]# signal for determining the polarity of the D[15:0]# signals on the external data bus 107.

The remaining signals DBI[3:1]/DBI[3:1]# and D[63:16]/D[63:16]# operate in substantially identical manner on a group-by-group basis. In the embodiments illustrated, each group includes 16 data bits but it is understood that any number of bits is contemplated for each group or for the entire data bus. In general, the entire data bus or each group includes N bits where N is a positive integer. The bus state sense mechanism and inverter 105 is configured to invert all N data bits if at least N/2+1 bits change state from one bus cycle to the next.

It is appreciated by those skilled in the art that a sense mechanism for microprocessor bus inversion according to an embodiment of the present invention solves the problem of rapidly evaluating state changes for a group of data output bits for the purpose of inverting their state and indicating bus inversion, such as according to X86 microprocessor protocol. Voltage divider networks and a comparator form an analog adder or analog sense amplifier which resolves the determination of a majority of changed data bits much faster than the conventional method employing a combinatorial digital adder. The faster majority evaluation of changed bits achieved by the analog adder avoids the potential of additional clock delays that would otherwise significantly decrease microprocessor performance and efficiency.

Although the present invention has been described in considerable detail with reference to certain preferred versions thereof, other versions and variations are possible and contemplated. For example, although the present invention is illustrated for use with X86 type microprocessors, other processors and circuit devices and components are contemplated in which it is desired to employ data bus inversion. Also, the analog adder may be implemented with different types of sensing devices other than N-channel and P-channel devices, such as bipolar transistors and the like. Further, the number of P-channel devices is shown generally equal to the number of N-channel devices of the voltage divider networks, although any suitable number of P-channel devices is contemplated. Those skilled in the art should appreciate that they can readily use the disclosed conception and specific embodiments as a basis for designing or modifying other structures for providing out the same purposes of the present invention without departing from the spirit and scope of the invention as defined by the appended claims.

What is claimed is:

1. A sense mechanism for data bus inversion, comprising:
  a first memory device that stores bits of N-bit bus in a previous bus cycle; and
  an analog adder that compares said bits of said N-bit bus in said previous bus cycle with bits of said N-bit bus in a current bus cycle and that provides a data inversion signal indicative of whether more than half of said bits of said N-bit bus have changed state, wherein said analog adder comprises:
    a logic comparison circuit that compares said bits of said N-bit bus in said previous bus cycle with said bits of said N-bit bus in said current bus cycle and that provides a plurality of changed state bits; and an analog sense amplifier that provides said data inversion signal based on said plurality of changed state bits, wherein said analog sense amplifier comprises:
a first voltage divider network that divides a first voltage referenced to a common voltage into a weight voltage at a weight node, said weight voltage being one of a plurality of discrete voltage levels indicative of a number of said plurality of changed state bits being asserted, said first voltage divider network comprising:
at least one activated first P-channel device coupled between said weight node and said first voltage; and
N equivalent-sized first N-channel devices coupled between said weight node and said common voltage, each having a gate receiving a corresponding one of said plurality of changed state bits;
a reference circuit that provides a reference voltage relative to said first voltage and indicative of more than half of said plurality of changed state bits being asserted; and
a comparator that compares said reference voltage with said weight voltage and that provides said data inversion signal.

2. The sense mechanism of claim 1, further comprising:
said first memory device comprising a first register having an output providing said bits of said N-bit bus in said previous bus cycle; and
a second register having an input coupled to said output of said first register and an output that provides said bits of said N-bit bus in said current bus cycle.

3. The sense mechanism of claim 1, further comprising a plurality of exclusive-OR gates that combine said data inversion signal with each said bit of said N-bit bus in said current bus cycle to perform bus inversion.

4. The sense mechanism of claim 1, wherein said logic comparison circuit comprises a plurality of exclusive-OR gates which compare said bits of said N-bit bus in said previous bus cycle with said bits of said N-bit bus in said current bus cycle on a bit-by-bit basis for providing said plurality of changed state bits.

5. The sense mechanism of claim 1, wherein said reference circuit comprises a second voltage divider network which further comprises:
a number of activated second P-channel devices coupled between said reference node and said first voltage, wherein said number is equal to the number of said at least one activated first P-channel device;
N equivalent-sized second N-channel devices coupled between said reference node and said common voltage level, wherein half of said second N-channel devices are turned on and the other half are turned off; and
a half-sized activated N-channel device coupled between said reference node and said common voltage.

6. The sense mechanism of claim 1, said N-bit bus having N data bits, wherein said reference circuit provides said reference voltage at a voltage level in between a first discrete voltage level representing N/2 changed state bits and a second discrete voltage level representing N/2+1 changed state bits.

7. A microprocessor, comprising:
a chip including an external data bus and data logic providing a plurality of internal data bits for each bus cycle;
at least one bus state sense mechanism and inverter provided on said chip, each having an input coupled to said data logic and an output coupled to said external data bus, and each said bus state sense mechanism and inverter comprising:
a first memory device that stores said plurality of internal data bits from a prior bus cycle;
an analog adder that compares said plurality of stored internal data bits from said prior bus cycle with said plurality of internal data bits in a current bus cycle and that provides a data inversion signal to said external data bus indicative of whether more than half of said internal data bits have changed state, said analog adder comprising:
a data change sensor having a first input coupled to said logic for receiving said plurality of internal data bits in said current bus cycle, a second input coupled to said first memory device for receiving said plurality of internal data bits from said prior bus cycle, and an output providing a plurality of data change bits;
a reference circuit having a reference node that develops a reference voltage relative to a source voltage, said reference voltage indicative of more than half of said plurality of internal data bits changing state from said prior bus cycle to said current bus cycle;
a voltage divider network, coupled to said source voltage, having an input receiving said plurality of data change bits and an intermediate weight node that develops a weight voltage relative to said source voltage and indicative of the number of said plurality of data change bits that are asserted; and
a comparator that compares said reference voltage with said weight voltage and that provides said data inversion signal; and
a bus inverter having an input receiving said plurality of internal data bits in said current bus cycle and an output coupled to said external data bus, wherein said bus inverter selectively inverts said plurality of internal data bits in said current bus cycle based on said data inversion signal.

8. The microprocessor of claim 7, wherein said bus inverter comprises a plurality of exclusive-OR gates, each having a first input receiving said data inversion signal, a second input receiving a corresponding one of said internal data bits in said current bus cycle and an output providing an output data bit for said external data bus.

9. The microprocessor of claim 7, wherein said first memory device comprises a register.

10. The microprocessor of claim 7, said external data bus comprising N bits, wherein said voltage divider network comprises:
at least one first P-channel device coupled between said source voltage and said weight node, each being turned on; and
N equivalent-sized first N-channel devices coupled between said weight node and ground and each being turned on or off based on a corresponding one of said plurality of data change bits.

11. The microprocessor of claim 10, wherein said reference circuit comprises:
at least one first P-channel device coupled between said source voltage and said reference node, each being turned on;
N equivalent-sized second N-channel devices coupled between said reference node and ground including N/2 second N-channel devices that are turned on and N/2 second N-channel devices that are turned off; and
a half-bit N-channel device with a width that is half that of said N equivalent-sized N-channel devices, said half-bit N-channel device being coupled between said reference node and ground and being turned on.

12. The microprocessor of claim 7, wherein said external data bus is divided into a plurality of groups and wherein said at least one bus state sense mechanism and inverter includes one for each of said plurality of groups of said external data bus.

13. A method of data bus inversion, comprising:

determining a number of bits of a data bus that change state between bus cycles;

converting the number of bits that change state to a corresponding weight voltage,
  wherein said converting the number of bits that change state to a corresponding weight voltage comprises activating a voltage divider device of a first voltage divider network for each of the number of bits that change state to select a corresponding one of a plurality of discrete voltage levels as the weight voltage;

providing a reference voltage indicative of more than half of the bits of the data bus changing state, wherein said providing a reference voltage comprises pre-programming voltage divider devices of a second voltage divider network with substantially similar voltage divider devices as the first voltage divider network to generate the reference voltage at a voltage level between a first of the plurality of discrete voltage levels corresponding to one-half of the data bits changing state and a second of the plurality of discrete voltage levels corresponding to one-half of the data bits changing state plus one;

comparing the weight voltage with the reference voltage; and inverting the data bus if more than half of the bits of the data bus change state.

14. The method of claim 13, wherein said determining a number of bits of a data bus that change state between bus cycles comprises:

storing the bits of the data bus for each bus cycle; and comparing the stored bits of the data bus from a prior cycle with corresponding bits of the data bus from a subsequent bus cycle.

15. The method of claim 14, wherein said comparing the stored bits of the data bus from a prior cycle with corresponding bits of the data bus from a subsequent bus cycle comprises exclusive-ORing each bit from the prior bus cycle with a corresponding bit from the subsequent bus cycle.

\* \* \* \* \*